United States Patent [19]

Hausamann et al.

[11] Patent Number: 5,053,630
[45] Date of Patent: Oct. 1, 1991

[54] METHOD AND APPARATUS FOR DETERMINING THE SIGN OF THE DIRECTION OF A PARTICLE STREAM

[75] Inventors: Dieter Hausamann, Gilching, Fed. Rep. of Germany; Brian W. Davis, Edinburgh, England

[73] Assignee: Deutsche Forschungs- und Versuchsanstalt für Luft- und Raumfahrt e.V., Köln, Fed. Rep. of Germany

[21] Appl. No.: 452,447

[22] Filed: Dec. 19, 1989

Related U.S. Application Data

[63] Continuation-in-part of Ser. No. 366,914, Jun. 16, 1989, abandoned.

[30] Foreign Application Priority Data

Jun. 18, 1988 [DE] Fed. Rep. of Germany ....... 3820654

[51] Int. Cl.$^5$ .......................................... G01N 15/06
[52] U.S. Cl. ........................................ 250/574; 356/5
[58] Field of Search ..................... 250/561, 574; 356/5, 356/28, 28.5, 342

[56] References Cited

U.S. PATENT DOCUMENTS

4,721,385 1/1988 Jelalian et al. ..................... 356/28.5

Primary Examiner—David C. Nelms
Attorney, Agent, or Firm—Browdy and Neimark

[57] ABSTRACT

In a method in which a heterodyne-laser-Doppler method is used for the determination of the sign of the direction of a particle stream, the beam from a laser source is directed by means of an optical arrangement used as an emitter optical system to a measuring volume in an interferometer device. A frequency difference between the emitted laser beam and the laser beam returning into the optical arrangement is measured through heterodyne reception by means of the same optical arrangement used as a receiving optical system; this returning laser beam is frequency-shifted because of scattering by particles moving with the same speed in the particle stream and because of the Doppler effect. In the method according to the invention, an additional Doppler shift with a definite sign then is alternately impressed on the laser beam in exactly defined areas of beam paths, the additional Doppler shift being preferably considerably smaller than the Doppler shift generated by the particle movement. The exact direction of the particle stream then is determined from the received scattered back laser beam by comparison of this scattered back laser beam with a laser source reference beam. The additional Doppler shift can be impressed on a reference beam or emitted beam split from the laser beam, on the laser beam scattered back by the measuring volume or on the emitted beam and signal beam flowing in opposite directions in the optical arrangement.

16 Claims, 6 Drawing Sheets

METHOD AND APPARATUS FOR DETERMINING THE SIGN OF THE DIRECTION OF A PARTICLE STREAM

FIELD OF THE INVENTION

This is a continuation-in-part of copending application Ser. No. 7/366,914, filed June 16, 1989 now abandoned, the contents of which are hereby incorporated by reference.

The invention relates to a method for the determination of the sign of the direction of a particle stream by use of a heterodyne-laser-Doppler method to determine the velocity, in which in an interferometer device the beam of a laser source is directed to a volume to be measured by means of an optical arrangement used as optical emitter and in which, by use of the same optical arrangement used as optical receiver, a frequency difference is measured by means of heterodyne reception between the transmitted laser beam and the laser beam returning into the optical arrangement used as an optical receiver, the latter having been frequency-shifted as a result of scattering caused by particles moving in the particle stream with the same speed and because of the Doppler effect, and where an additional frequency shift is impressed on the laser beam. The invention also relates to an apparatus for implementing the method by the use of an interferometer device having a laser source, an optical arrangement used as optical emitter and receiver, of reflecting mirrors, of beam splitters, a Brewster window and of $\lambda/4$ and $\lambda/2$ phase-shifter plates.

BACKGROUND OF THE INVENTION

Devices for executing such methods are categorized under the term Laser-Doppler Anemometer (called hereinafter LD anemometers for simplicity's sake) which operate on the basis of two entirely different methods for determining the speed of particle flows.

a. In a single beam LD anemometer (also referred to as heterodyne or homodyne or reference beam LD anemometer) the Doppler shift of a scattered light source is used to determine the speed. The radiation of a coherent light source is directed to the volume to be measured and the light scattered by the particle stream is Doppler-shifted. The Doppler-shifted scattered wave is impressed on a detector over a non-scattered, coherent light beam; the electrical signal being generated in the course of this superimposition process indicates the difference frequency between scattered and non-scattered light sources.

If the reference radiation has the same frequency as the radiation directed on the volume to be measured, the difference frequency on the detector equals the amount of the Doppler shift; this is called a homodyne LD anemometer.

If the frequency of the reference radiation is shifted in respect to the frequency of the radiation directed on the volume to be measured, then this is a heterodyne LD anemometer. To be able to determine the sign of the velocity vector in a measuring process, the amount of the frequency shift of the reference beam must be larger than or at least equal to the Doppler shift of the scattered wave. This prerequisite has been met in all heterodyne LD anemometers known to-date.

b. In contrast to the single beam LD anemometer, in the two-beam-crossed-beam or the so-called crossed beam method the radiation from two coherent light sources is crossed at a defined angle in the volume to be measured, because of which an interference pattern forms in the volume to be measured. A particle moving through this interference pattern creates a periodic change of the scattered light; this appears light in the interference maximums and dark in the minimums.

It is always possible to definitely assign LD anemometers to single- or multi-beam systems based on the difference of the measuring techniques sketched under a and b above. Accordingly, the present method is a single beam system in the form of a heterodyne or reference beam LD method, clearly shown in the preamble of the main claim.

The velocity of the scattering object is determined in the Doppler-laser method from the Doppler shift of a light wave scattered by a moving object. However, with the customary homodyne method the amount of the velocity component can be measured only in the direction of observation. The sign of this velocity component can only be determined by means of a heterodyne method, as will be explained in detail below.

The coherent superimposition on a photo-electrical element of a light wave with a frequency $f_g$ on a non-scattered light source with a frequency of $f_r$ creates a current or voltage signal with a frequency of $\Delta f_m$, the size of which equals the amount of the difference of the frequencies $f_g$ and $f_r$:

$$\Delta f_m = |f_g - f_r| \tag{1}$$

If the same coherent light source with the frequency $f_o$ is made the basis of both light waves, only the frequency change $\Delta f_D$ (Doppler shift) caused by a scattering action becomes relevant, so that for the frequencies $f_r$ and $f_g$ of the non-scattered and the scattered light waves and thus for the difference frequency $\Delta f_m$ the following applies:

$$f_r = f_o \tag{2}$$

$$f_g = f_o + \Delta f_D \tag{3}$$

$$\Delta f_m = |f_r - f_g| = |\Delta f_D| \tag{4}$$

In this homodyne case the measured difference frequency $\Delta f_m$ equals the amount of the Doppler shift $\Delta f_D$.

Figure 1:
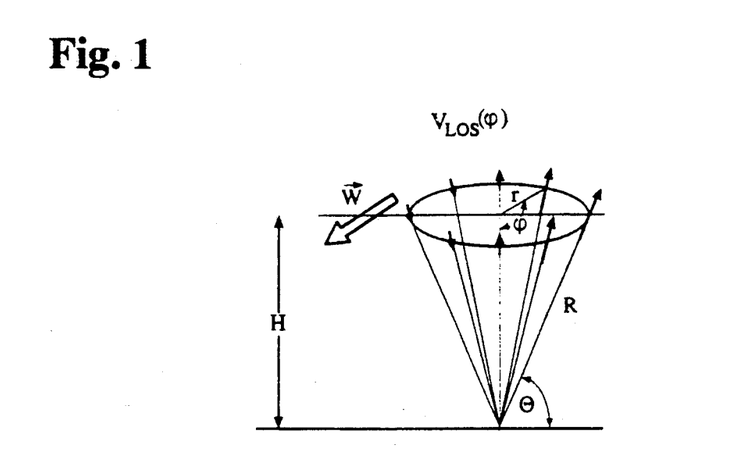
FIG. 1 is a basic representation of the conical scan for scanning a wind zone at a set altitude.

The homodyne LD method is an active measuring method used, for example, to determine wind direction; a continuous signal laser is used as beam source, the output of which is focused by means of a telescope on a measuring volume at the distance R (FIG. 1). Additionally, a wind vector $\vec{w}$ is shown in FIG. 1, the azimuth angle $\phi = 0$ was selected in FIG. 1, i.e. the wind vector $\vec{w}$ lies in the drawing plane.

Part of the beam is scattered back from aerosol particles moving through the volume to be measured with the velocity of a stream of air. The scattered beam experiences a frequency change $\Delta f_D$ because of a Doppler shift of $$\Delta f_D = 2 \cdot \frac{V_{LOS}}{c} \cdot f_o \tag{5}$$

where $f_o$ is the frequency of the laser, c is the speed of light and $V_{LOS}$ is the component of the wind speed in the direction of measuring, i.e. the radial or line-of-sight component.

A signal (in the form of the light scattered back) with a frequency $(f_o + \Delta f_D)$ and a part of the emitted laser light as reference signal with the reference $f_o$ are impressed on a detector (heterodyne reception) and there generate an electrical signal, the AC portion of which contains the differential frequency $\Delta f_m$ between reference beam and signal beam.

The method of the so-called conical scan is used to determine wind velocity and wind speed; here the scanning beam is pivoted below a fixed elevation angle $\theta$ respect to the vertical and the vertical is pivoted as axis by an azimuth angle $\phi$. Thus a wind zone is being scanned at an altitude H along the envelope of a cone on the basic circle of an observation cone having the radius r at the distance R (see FIG. 1).

Figure 2:
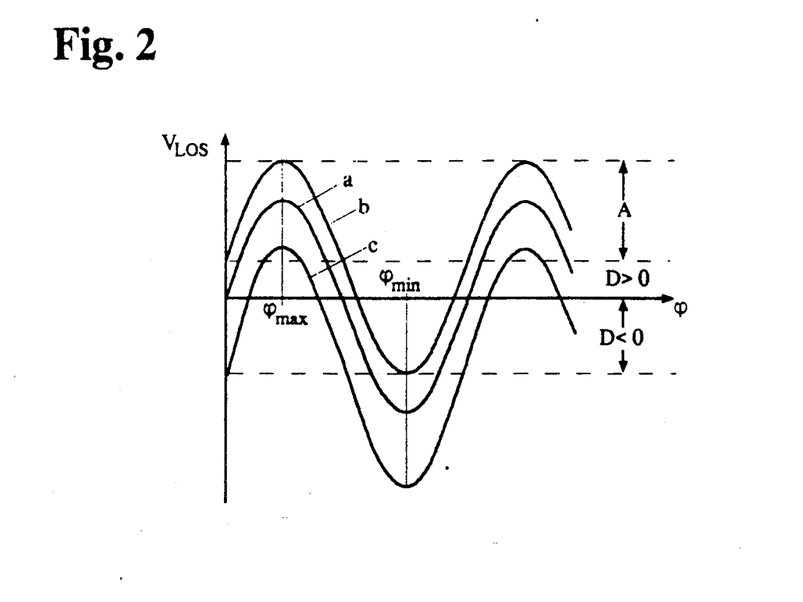
FIG. 2 is a displaced sinus function as the functional interrelation of an observable wind component ($V_{LOS}$) in relation to the azimuth angle ($\phi$) with different displacements (D) based on vertical wind components.

In a homogenous wind zone the result for the observable wind component $V_{LOS}$ as a function of the azimuth angle $\phi$ is a sinus function (FIG. 2):

$$V_{LOS}(\phi) = A \sin(\phi + \phi_0) + D \qquad (6)$$

with an amplitude A, a displacement D and an initial phase $\phi_o$. The result for the wind component $V_{LOS}$ in the direction of observation as a function of the azimuth angle $\phi$ is a. if the vertical wind component is missing, no displacement, i.e. D=0.
b. with a vertical wind component upward, a displacement of D>0, and
c. with a vertical wind component downwards, a displacement D<0.

All magnitudes of a wind zone can be determined from the path of this function, i.e. the horizontal wind velocity from $$w_\parallel = \frac{D}{\cos\theta} \qquad (7a)$$

and the vertical wind velocity from $$w_\perp = \frac{A}{\sin\theta} \qquad (7b)$$

The wind direction is shown by $\phi_{min}$ (i.e. the wind vector points in the direction $\phi_{min}$). The value $\phi_o$ determines the orientation of the measuring axis in relation to the absolute geographical direction. Because the measuring axis can be optionally oriented, $\phi_o = 0$ has been assumed below, as was the case already in FIGS. 1 and 2.

As explained above, in particular in connection with equations (3) and (4), in the homodyne method the amount of the frequency shift $\Delta f_D$ is measured on the basis of the Doppler effect. The measured value is a (positive) frequency and is:

$$\Delta f_m = |\Delta f_D| \sim |V_{LOS}| \qquad (8)$$

The result of the described and known method of the so-called conical scan thus is:

$$\Delta f_m(\phi) = |A' \cdot \sin\phi + D'| \qquad (9)$$

with $$A' = 2 \cdot \frac{f_0}{c} \cdot A \text{ und } D' = \frac{f_0}{c} \cdot D$$

Figure 3A:
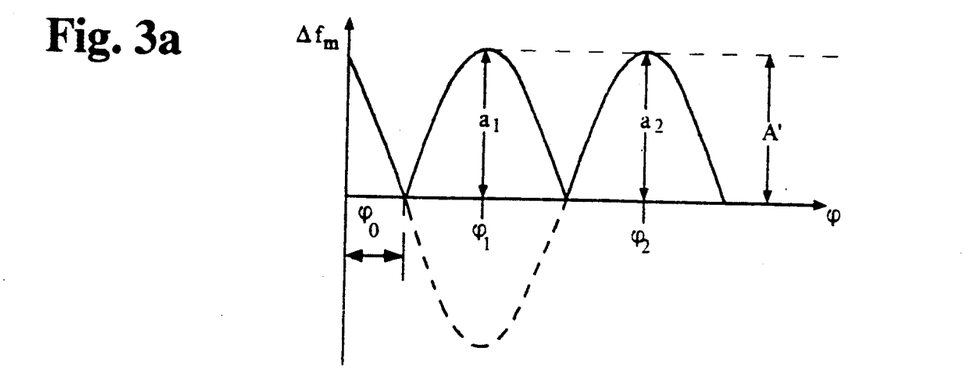
FIGS. 3a, 3b and 3c show a frequency shift ($\Delta f_m$) in relation to the azimuth angle ($\phi$) for different displacements (D')
Figure 3B:
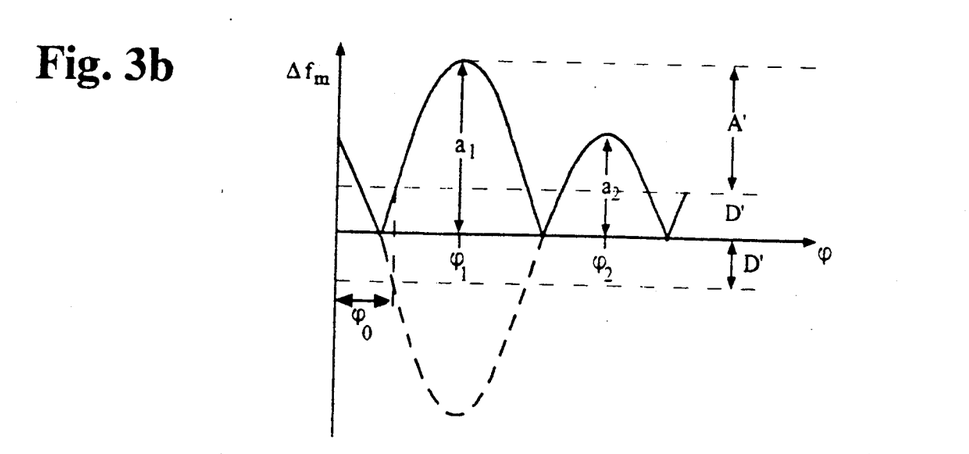
Figure 3C:
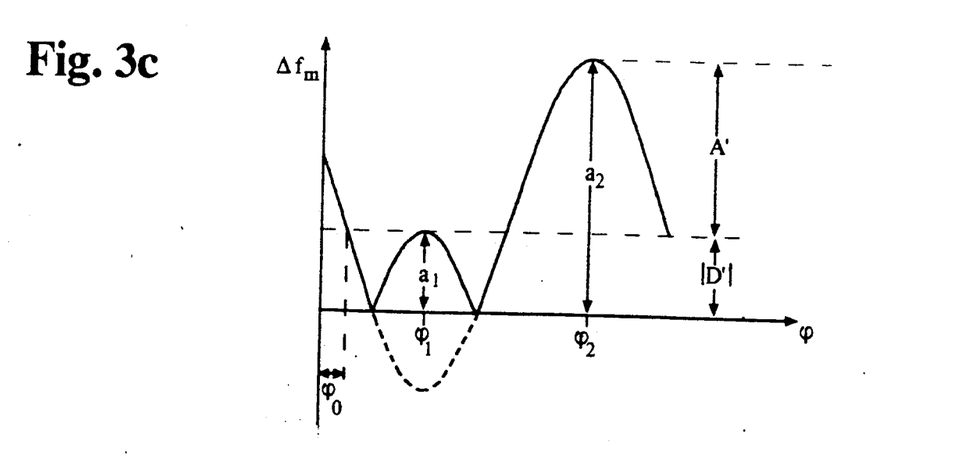

Therefore the amount of a displaced sinus function is being measured. It has been sketched in detail in FIG. 3 for the cases already mentioned above, namely a. D=0 (no vertical wind); FIG. 3a;
b. D>0 (vertical wind upward); FIG. 3b;
c. D<0 (vertical wind downward); FIG. 3c.

As can be clearly seen from this, a differentiation between the absolute minimum and the absolute maximum of the function is basically no longer possible. It is therefore only possible to exactly determine the wind direction to $\pm 180°$; however, this means that the definition of the sign of the horizontal wind component is not possible with the homodyne method; for the same reasons a determination of the sign of the vertical wind direction is also impossible.

The indefiniteness of direction in the homodyne method can be removed by means of an additional (positive) frequency shift $\Delta f_s$ between signal and reference beam. This basic idea of the known heterodyne methods for the determination of the sign is contained, for example, in British Patent 1 554 561 (1975), in U.S. Pat. No. 3,428,816 (1969), in German Patent DE-PS 34 40 376 or in German Published, Non-examined Patent Application DE-OS 37 13 229.

If in a reference light wave a frequency other than $f_l$ is chosen as the frequency $f_o$ of the light wave prior to the scattering action, then the following is true:

$$f_r = f_o + \Delta f_s = f_l \qquad (10)$$

$$f_g = f_o + \Delta f_D \qquad (11)$$

the difference of the frequencies $f_o$ and $f_l$ being expressed by $\Delta f_s$. The reference frequency $f_l$ can be generated from the frequency $f_o$ by a frequency shift $\Delta f_s$. In this heterodyne case the following is true for the measured difference frequency:

$$f_m = |f_r - f_g| = |\Delta f_s - \Delta f_D| \qquad (12)$$

Together with the requirement customary in known heterodyne systems that the frequency shift $\Delta f_s$ of the non-scattered radiation be larger than or equal to in its amount to the amount of the Doppler shift $f_D$, the determination of the sign of $\Delta f_D$ can be obtained from a measurement of $\Delta f_m$. The following cases can then be differentiated:

Case a: $\Delta f_s > 0$

In this case the amount lines may be omitted and the following is true for the difference frequency $\Delta f_m$:

$$\Delta f_m = \Delta f_s - \Delta f_D \begin{cases} = |\Delta f_s| \text{ for } \Delta f_D = 0 \\ > |\Delta f_s| \text{ for } \Delta f_D < 0 \\ < |\Delta f_s| \text{ for } \Delta f_D > 0 \end{cases} \qquad (13)$$

Case b: $\Delta f_s < 0$

In this case the signs are reversed if the amount lines are omitted and the following is true for the difference frequency $\Delta f_m$:

$$\Delta f_m = -\Delta f_s + \Delta f_D \begin{cases} = |\Delta f_s| \text{ for } \Delta f_D = 0 \\ > |\Delta f_s| \text{ for } \Delta f_D > 0 \\ < |\Delta f_s| \text{ for } \Delta f_D < 0 \end{cases} \qquad (14)$$

In both cases the frequency shift $f_m$ of the measured signal in relation to the known frequency shift of the reference beam $|\Delta f_s|$ is examined:

If the measured frequency shift $\Delta f_m$ is larger than $|\Delta f_s|$, the sign of the Doppler shift $\Delta f_D$ is
 in case a (i.e. for $\Delta f_s > 0$) negative, and
 in case b (i.e. for $\Delta f_s < 0$) positive.

If the difference frequency $\Delta f_m$ is smaller than the amount of the difference shift $|\Delta f_2|$, the sign of the Doppler shift $\Delta f_D$ is
 in case a (i.e. for $\Delta f_s > 0$) positive, and
 in case b (i.e. for $\Delta f_s > 0$) negative.

Thus, one measuring operation is sufficient to determine the sign of the Doppler shift, provided that the amount of the frequency shift $\Delta f_s$ of the reference radiation is larger than or equal to the amount of the Doppler shift $\Delta F_D$.

The advantage of being able to determine the sign of the Doppler shift $\Delta f_D$ in one single measuring operation is, however, offset to a large degree by serious technical problems in generating a sufficiently large frequency shift $\Delta f_s$.

Figure 4:
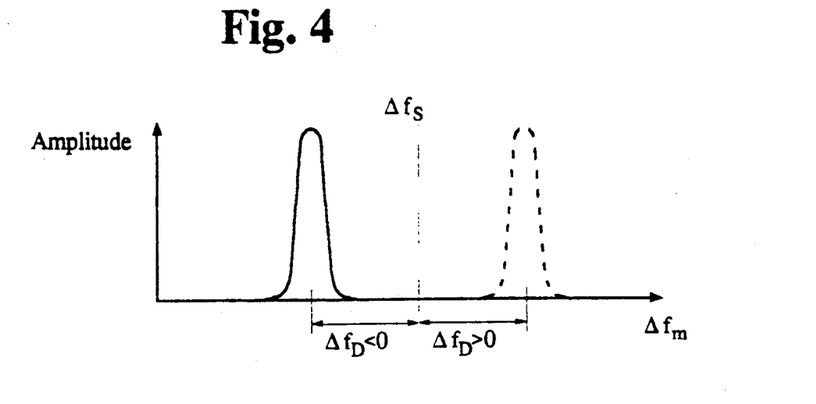
FIG. 4 is a basic representation of a known heterodyne method with a Doppler shift in relation to a large additional frequency shift ($\Delta f_s$)

In all heterodyne methods for the determination of the sign so far known, the frequency shift $\Delta f_s$ must be large compared to the Doppler shift $\Delta f_D$ to be measured, i.e. $\Delta f_s >> \Delta f_D$. As can be seen from FIG. 4, it is then possible to determine the sign of the Doppler shift ($\Delta f_D$) relative to the frequency shift $\Delta f_s$ and thus the sign of the wind vector.

However, the applicability of the known heterodyne methods is highly restricted or the known heterodyne methods are hardly used in actuality, mainly because of the high degree of technical effort required, such as additional optical components which are hard to adjust and sensitive, additional lasers, etc. The heterodyne method has had wider application only in airborne systems where a large additional Doppler displacement is a priori present because of the proper motion.

SUMMARY OF THE INVENTION

It is therefore an object of the invention to provide a method and an apparatus for the determination of the sign of the direction of a particle stream by expanding a homodyne system into a heterodyne system in a simple manner without a need for the additional frequency shifts which are subject to technical difficulties.

In accordance with the invention this has been attained in a method for the determination of the sign of the direction of a particle stream in accordance with the preamble to claim 1 by means of the features in the characterizing part of claim 1. This has also been attained in an apparatus for implementing the method in accordance with the preamble of claim 7 by means of the features in the characterizing part of claim 7. Advantageous developments are the object of the several dependent claims referring back to the above claims.

In the method according to the invention the prerequisites and thus the conditions and ways of looking at the customary heterodyne methods have been reversed. In accordance with the invention, an additional frequency shift is required, which always must be smaller in amount than the amount of the Doppler shift. The frequency change of the measured signal is then related to an (unknown) frequency change $\Delta f_D$ of the scattered signal.

Furthermore, at least two measurement operations are required for determining the sign during different frequency shifts $\Delta f_s$, i.e. the frequency shift $\Delta f_s$ must be temporally displaceable.

Only by the comparison of at least two measuring operations at different times with different frequency shifts $\Delta f_s(t_1)$ and $\Delta f_s(t_2)$ is it possible to determine the sign of the frequency change $\Delta f_D$ caused by a frequency shift.

The two cases a and b described below must be differentiated in this case, namely Case a: for $\Delta f_s > 0$ the result for the difference $\Delta f_m$ is:

$$\Delta f_m = |\Delta f_s - \Delta f_D| \begin{cases} > |\Delta f_D| \text{ for } \Delta f_D < 0 \text{ case [1]} \\ < |\Delta f_D| \text{ for } \Delta f_D > 0 \text{ case [2]} \end{cases} \quad (15)$$

Case b: for $\Delta f_s < 0$ the result for the difference $\Delta f_m$ is:

$$\Delta f_m = |\Delta f_s - \Delta f_D| \begin{cases} > |\Delta f_D| \text{ for } \Delta f_D > 0 \text{ case [3]} \\ < |\Delta f_D| \text{ for } \Delta f_D < 0 \text{ case [4]} \end{cases} \quad (16)$$

Because the amount and sign of the frequency change in the form of a Doppler shift $\Delta f_D$ are unknown, a single measurement is not sufficient. Even if sign and amount of the additional frequency shift $\Delta f_s$ are known, it is not possible to determine from one measurement of the difference frequency $\Delta f_m$ whether the measured value, i.e. the difference frequency $\Delta f_m$, is greater (cases [1] and [3]) or smaller (cases [2] and [4]) than the amount of the Doppler signal to be determined. Only a measurement of at least two different frequency shifts definitely determines the sign of the Doppler shift.

The following possibilities exist for determining the sign by taking two measurements, namely
a first measurement $$\Delta f_m^{(1)} = |\Delta f_s(t_1) - \Delta f_D| \quad (17)$$

and
a second measurement $$\Delta f_m^{(2)} = |\Delta f_s(t_2) - \Delta f_D| \quad (18)$$

With $\Delta f_s(t_1) = 0$ no additional frequency shift results. The measured frequency $\Delta f_m^{(2)}| = |\Delta f_D|$ constitutes the amount of the Doppler shift.

1. For $\Delta f_s(t_2) > 0$, the measured frequency becomes $$\Delta f_m^{(2)} = |\Delta f_s(t_2) - \Delta f_D| \quad (19)$$

If
$$\Delta f_m^{(2)} < \Delta f_m^{(1)} = |\Delta f_D| \quad (20)$$
(20)

it follows for the Doppler shift $\Delta f_D$: $\Delta \Delta f_D > 0$, which corresponds to case [2]. $\Delta$However, if $$\Delta f_m^{(2)} > \Delta f_m^{(1)} = |\Delta f_D| \quad (21)$$

it follows for the Doppler shift $\Delta f_D$ : $\Delta \Delta f_D < 0$, which corresponds to case [1].

2. For $\Delta f_s(t_2) < 0$, the measured frequency becomes
$$\Delta f_m^{(2)} |\Delta f_s(t_2) - \Delta f_D| \quad (22)$$

If $$\Delta f_m^{(2)} > \Delta f_m^{(1)} = |\Delta f_D| \qquad (23)$$

it follows for the Doppler shift $\Delta f_D$: $\Delta\Delta f_D > 0$, which corresponds to case [3]. However, if $$\Delta f_m^{(2)} < \Delta f_m^{(1)} = |f_D|, \qquad (24)$$

it follows for the Doppler shift $\Delta f_D$: $\Delta f_D < 0$, which corresponds to case [4].

b. With $\Delta f_s(t_2) < \Delta f_s(t_1)$, i.e. with a reduction of $\Delta f_s$, the result for the two frequencies $\Delta f_m^{(1)}$ and $f_m^{(2)}$ is:

$$\Delta f_m^{(1)} = |\Delta f_s(t_1) - \Delta f_D| \qquad (25)$$

$$\Delta f_m^{(2)} = |\Delta f_s(t_2) - \Delta f_D| \qquad (26)$$

1. If $\Delta f_m^{(2)} > \Delta f_m^{(1)}$, which corresponds to an increase of $\Delta f_s$, it follows for the Doppler shift $\Delta f_D$: $\Delta f_D > 0$, which corresponds to cases [2] and [4].

2. If $\Delta f_m^{(2)} < \Delta f_m^{(1)}$, which corresponds to a decrease of $\Delta f_m$, it follows for the Doppler shift $\Delta f_D$: $\Delta f_D < 0$, which corresponds to cases [1] and [3].

c. With $\Delta f_s(t_2) > \Delta f_s(t_1)$, i.e. with an increase of $\Delta f_s$, the result is:

1. With $\Delta f_m^{(2)} > \Delta f_m^{(1)}$, i.e. with an increase of $\Delta f_m$, the result for the Doppler shift $\Delta f_D$ is $\Delta f_D < 0$, which corresponds to cases [1] and [3].

2. With $\Delta f_m^{(2)} < \Delta f_m^{(1)}$, i.e. with a decrease of $\Delta f_m$, the result for the Doppler shift $\Delta f_D$ is $\Delta f_D > 0$, which corresponds to cases [2] and [4].

With the methods described under a, above, the measurement is used without an additional frequency shift $\Delta f_s$ as a first measuring point and the change of the measured frequency $\Delta f_m$ with positive or negative frequency shift $\Delta f_s$ is considered.

The methods described under b and c, above, describe the general case of how, by means of two measurements of the frequency $\Delta f_m$ during increasing or decreasing frequency of the additional frequency shift $\Delta f_s$, the sign of the frequency change or of the Doppler shift $\Delta f_D$ is measured. The case where the changes of $\Delta f_s$ consist of a change of the sign of $\Delta f_s$ is also contained in this. In the same way the method in accordance with 1 is contained in the general cases:

Case a 1 corresponds to case c with $\Delta f_s(t_1) = 0$, and
Case a 2 corresponds to case b with $\Delta f_s(t_1) = 0$.

The invention will be described in detail below by means of preferred exemplary embodiments, taking reference to the attached drawings.

DETAILED DESCRIPTION OF THE PREFERRED EMBODIMENTS

An additional frequency shift $\Delta f_s$ between a signal and a reference beam again is the basis of the method for the determination of the sign of the direction of a particle stream in accordance with the invention. In contrast to the methods known and used so far, however, the frequency shift $\Delta f_s$ is small compared to a Doppler shift $\Delta f_D$, and the sign of the frequency shift $\Delta f_s$ is not necessarily positive.

Figure 5:
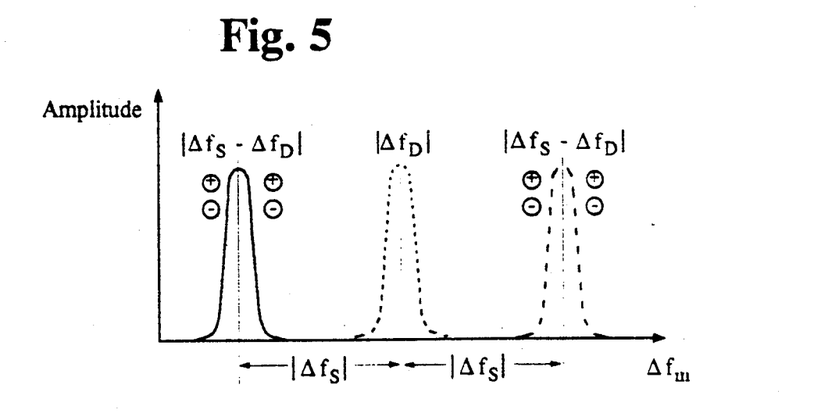
FIG. 5 is a basic representation of the method according to the invention.

If the additional frequency shift $\Delta f_s$ is impressed on a Doppler shift $\Delta f_D$, the measured signal frequency is displaced, as can be seen in FIG. 5, towards higher frequencies, if both frequency shifts have different signs, or towards lower frequencies, when both frequency shifts have the same sign.

Figure 6:
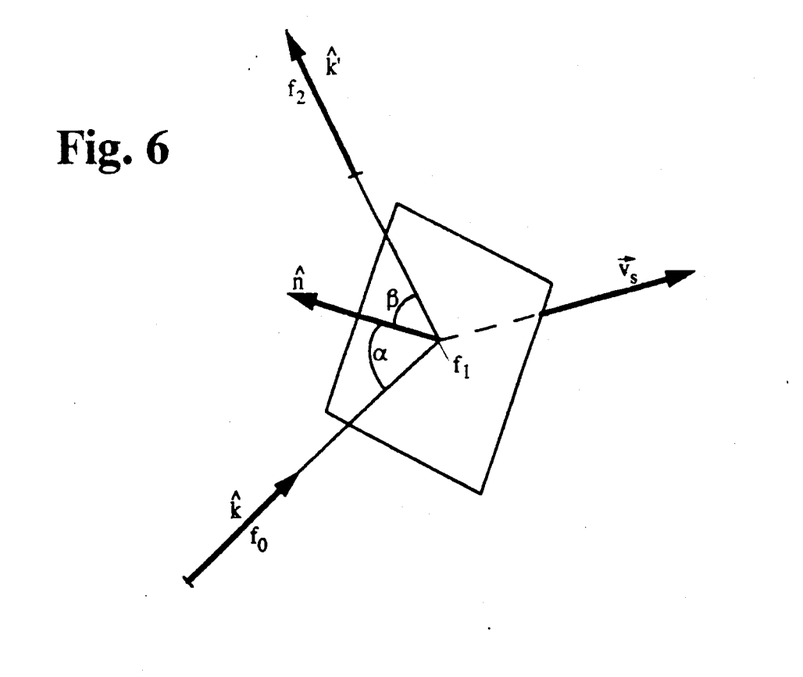
FIG. 6 is a basic representation of the reflection of a light beam by a moving mirror.

An additional frequency shift is generated by a moving mirror disposed in the reference or the signal beam; a light wave falling on a moving mirror always is Doppler-shifted. Now, if the mirror (having a surface normal vector $\lambda$) is moved with a velocity $\vec{v}_s$ ($v_s \ll c$), a light beam with the frequency $f_0$ striking in the direction R is emitted in the direction R' in accordance with the Law of Reflection (angle of incidence $\alpha$ = angle of reflection $\beta$) and as shown in FIG. 6, and is frequency-shifted as follows:

In the closed-circuit system of the mirror, the incident light wave has the frequency $f_1$, namely $$f_1 = f_0 \left( 1 - \frac{\hat{k} \cdot \vec{v}_s}{c} \right) \qquad (27a)$$

where $\hat{K}$ is the direction of incidence of the light beam with the frequency $f_0$, $\hat{K}'$ is the direction of reflection of the light beam with the frequency $f_2$, $\hat{n}$ is the normal vector at the mirror surface, $\vec{v}_s$ is the velocity vector of the mirror movement and $f_1$ is the frequency in the closed-circuit system of the mirror.

The observer at rest sees a light wave of the frequency $f_2$ reflected by the mirror as $$f_2 = f_1 \left( 1 + \frac{\hat{k}' \cdot \vec{v}_s}{c} \right) \qquad (27b)$$

The reflected beam is frequency-shifted in relation to the incident beam by a total of $$\Delta f_s = f_2 - f_0 = f_0 \cdot \frac{1}{c} \cdot (\hat{k}' - \hat{k}) \cdot \vec{v}_s \qquad (28)$$

If the direction of movement of the mirror is known, the sign of the frequency shift $\Delta f_s$ is fixed. A change in the direction of movement, i.e. of the sign of the frequency shift $\Delta f_s$ in relation to the Doppler shift $\Delta f_D$ results in a frequency shift to higher or lower frequencies of the signal frequency $\Delta f_m$ measured during the heterodyne reception. From this the sign of the wind direction can be clearly determined, as can be seen in the table reproduced below:

TABLE

| Sign of $\Delta f_s$ | Sign of the Shift of $\Delta f_m = \|\Delta f_D - \Delta f_s\|$ | Sign of $\Delta f_D =$ Sign of Wind Direction | Case |
|---|---|---|---|
| + | + | − | [1] |
| + | − | + | [2] |
| − | + | + | [3] |
| − | − | − | [4] |

Figure 7:
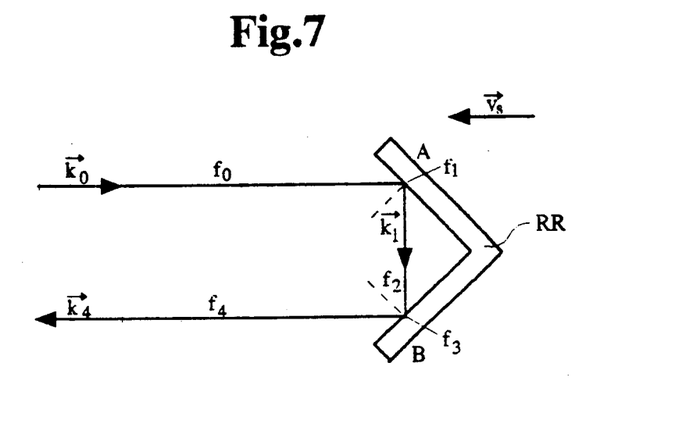
FIG. 7 is a basic representation of the reflection of a light beam by a retro-reflector.

A frequency shift $\Delta f_s$ can, for example, be caused by the reflection of a light beam from a level retro-reflector RR moved in the same direction (FIG. 7). The total frequency shift $\Delta f_s$ in accordance with equation (28) than is $$\Delta f_s = f_4 - f_0 = 2 \cdot f_0 \frac{v_s}{c} \quad (29)$$

wherein a Doppler shift occurs at the retro-reflector RR at a point A only during incidence and at a point B only during reflection of the beam. With a beam reflecting at point A and inciding at point B there is no Doppler reflection because of $\vec{k}_s \times \vec{v}_s = 0$. In FIG. 7, $k_0$, $k_2$, $k_4$, indicate the respective direction of the beam, $v_s$ the velocity vector of the mirror movement, $f_0$ the initial frequency, $f_1$, $f_3$ the frequencies in the closed-circuit system of the mirror, $f_2$ the frequency after reflection at point A (where $f_1 = f_2 = f_3$), and $f_4$ the frequency after reflection at point B.

The sign of the wind vector then is established by moving the retro-reflector RR back and forth and by determining the shift of the observed frequency $\Delta f_m$ to larger or smaller values in relation to the direction of movement of the retro-reflector acting as a mirror.

Figure 8:
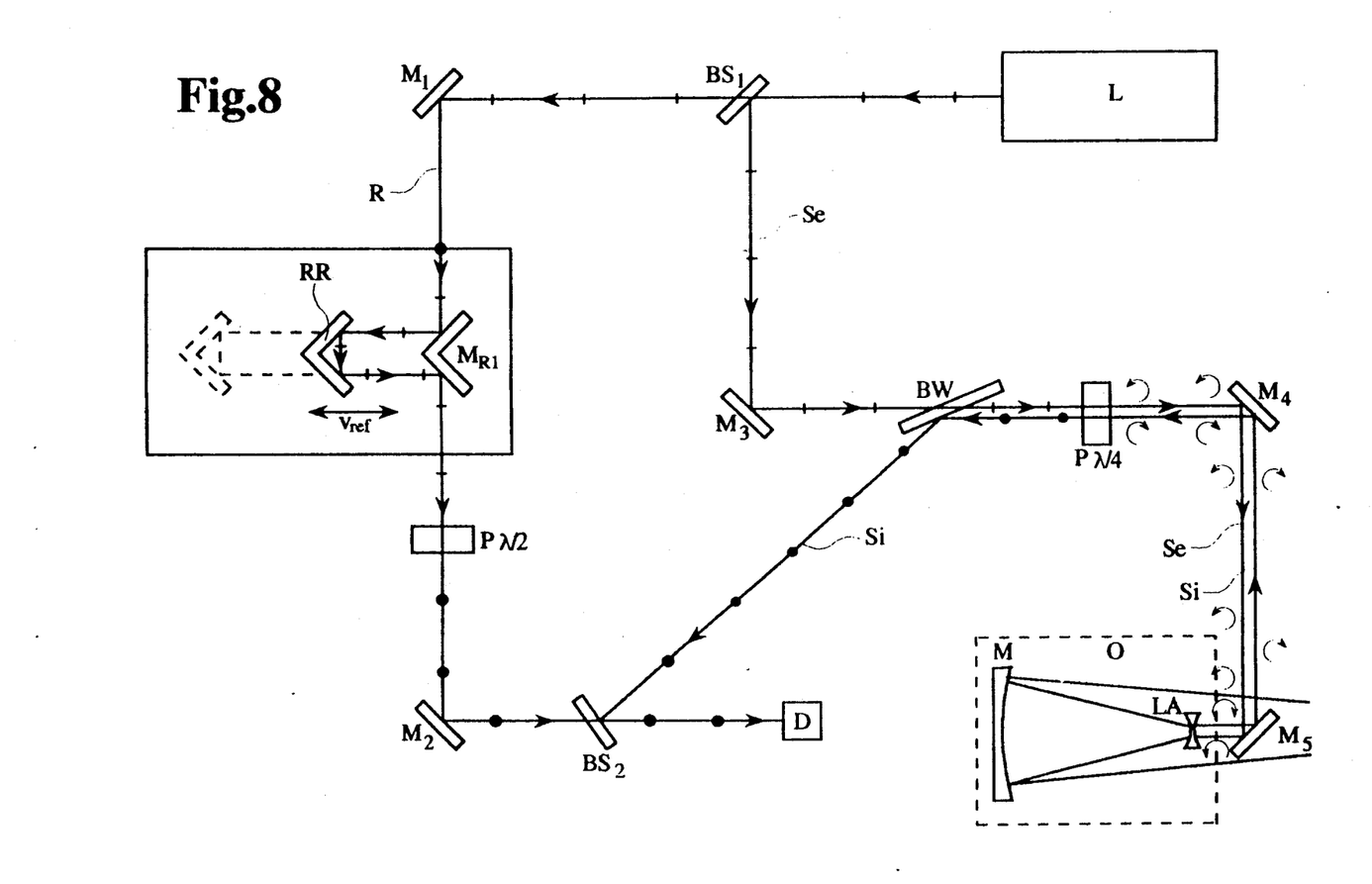
FIG. 8 is a schematic representation of an embodiment of the apparatus according to the invention for implementing the method.

Here four possibilities for the use of the apparatus according to the invention in the form of a retro-reflector RR put into back and forth movement may be used in an interferometer device commonly used for heterodyne reception, i.e. in a device as illustrated schematically in FIG. 8, namely the placement of the arrangement according to the invention 1. in the reference beam (R);
2. in the outgoing signal beam (Se);
3. in the incoming signal beam (Si) and
4. in the emitted and signal beam (Se/Si), i.e. at a location where the emitted and the signal beam extend parallel above each other in opposite directions.

The fourth possibility has the advantage that the outgoing light beam as well as the returning signal beam experience a Doppler shift in the same direction. In this case a double frequency shift is the result with the same velocity $v_s$ of the retro-reflector RR during its back and forth movement.

The arrangement in accordance with the invention is illustrated in FIG. 8 in the form where the retro-reflector RR, which can be put into back and forth movement, has been placed in the reference beam R (see 1 in the listing above). Alternatively to this, the arrangement in accordance with the invention in the form of the retro-reflector RR, which can be put into back and forth movement, can be provided in the area of the outgoing signal beam Se (see 2), or in the area of the incoming signal beam Si (see 3), or in an area (Se/Si, see 4) where, as already explained above, the emitted and signal beams flow parallel above each other in opposite directions.

In FIG. 8 there are provided in the interferometer device, in addition to the retro-reflector RR, which can be put into back and forth movement, a laser source L, a detector D, a telescopic half mirror M with an associated lens arrangement LA, which below is also called an optical arrangement 0, beam splitters $BS_1$ and $BS_2$, reversing mirrors $M_1$ to $M_5$, a Brewster window BW as well as phase shifter plates P $\lambda/2$ and P $\lambda/4$ for a phase shift of $\lambda/2$ or $\lambda/4$. Furthermore, the polarizations are shown in FIG. 8 as follows: the parallel polarization with |, the vertical polarization with ., the right-turn with     and the left-turn polarization with The different paths of the beams (R, Si, Se, Si/Se) are shown by solid lines and arrows, in addition to the path of the beams, the polarization in the respective sector is indicated by the different symbols explained above. When using the arrangement in accordance with FIG. 8, because the difference frequency between the signal and reference beam is being measured, namely $\Delta f_m = |sig - f_{ref}|$, when the arrangement according to the invention is placed in the reference beam R, it will be necessary to reverse the sign sequence for the frequency shift $\Delta f_s$ in the table.

Figure 9:
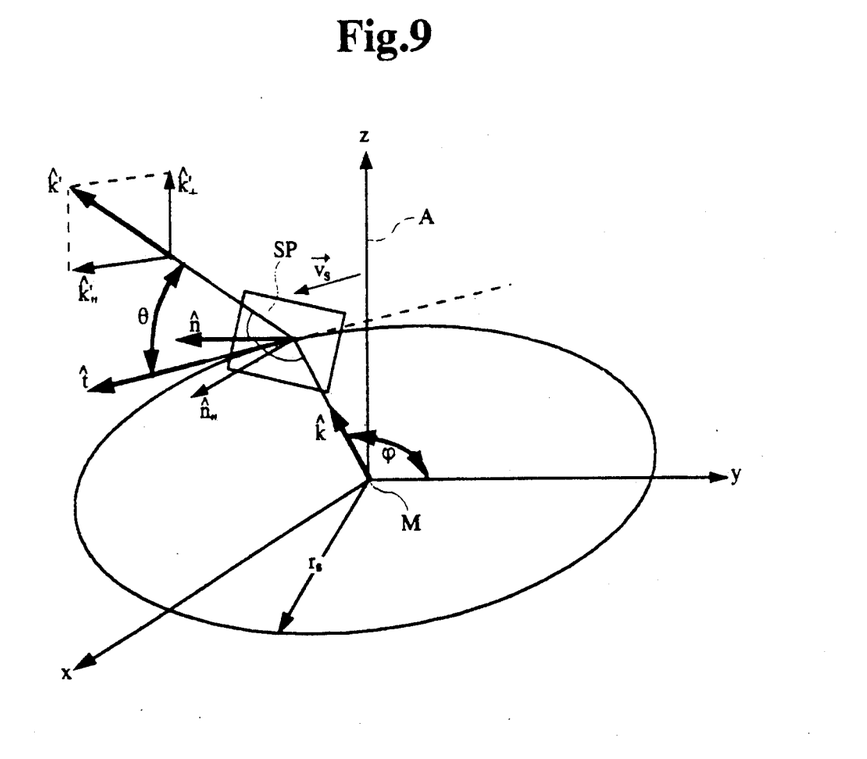
FIG. 9 is a basic representation of an embodiment of the apparatus according to the invention in the form of a rotating device.

As shown in FIG. 9, in many known wind measurement systems the transmission beam for a conical scan is directed onto the measuring volume tangentially to the mirror movement via an eccentrically rotating mirror SP. Further indicated in FIG. 9 are the direction of incidence K of the light beam, the direction of reflection K' of the light beam, K', and K'', the two components of K', the tangential vector t of the circular path, the normal vector k to the surface of the mirror SP,   , the component of   in the pivotal plane, the elevational angle $\theta$, the the azimuth angle $\phi$, the distance $r_s$ of the eccentrically rotating mirror SP from the center M of the arrangement, as well as x, y and z as the three axial directions extending vertically to one another.

A beam inciding in the direction K extends vertically to the direction of movement of the mirror SP and therefore does not experience a Doppler shift, because $K \times v_s = 0$. The beam emitted at an elevational angle $\theta$ from the mirror SP in the direction R' is Doppler-shifted by the frequency shift $f_{s,1'}$, namely $$\Delta f_{s,1} = f_0 \cdot \frac{v}{c} \cdot \cos\theta \quad (30a)$$

the same as the returning signal beam.

The entire frequency shift $\Delta f_s$, based on the rotation of the mirror SP, therefore is $$\Delta f_s = 2 f_0 \cdot \frac{v}{c} \cdot \cos\theta \quad (30b)$$

The sign for $\Delta f_s$ then is fixed by the direction of rotation of the mirror SP, wherein $\Delta f_s > 0$ with forward movement $(K' \times V_s > 0)$
$\Delta f_s < 0$ with reverse movement $(K' \times V_s < 0)$
applies.

For the observed frequency shift $\Delta f_m(\phi)$ with a conical scan (see FIGS. 1 and 2), the result in accordance with equation (6) is $$\Delta f_m(\phi) = |\Delta f_s - \Delta f_D| = |\Delta f_s - A' \times \sin\phi - D'|$$

Figure 10A:
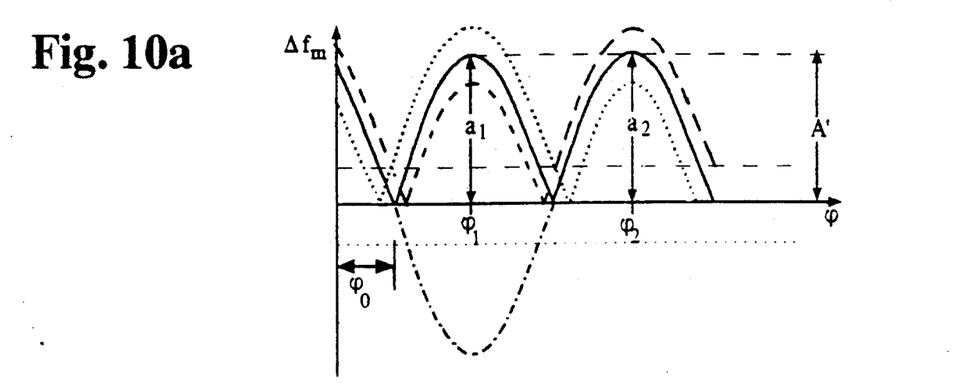
FIGS. 10a, 10b and 10c show a basic representation of the influence of a mirror rotation on the frequency shift ($\Delta f_m$).
Figure 10B:
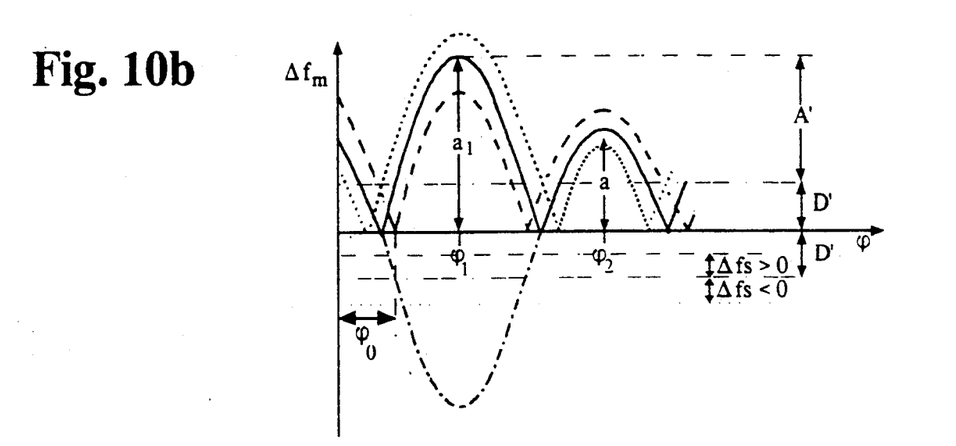
Figure 10C:
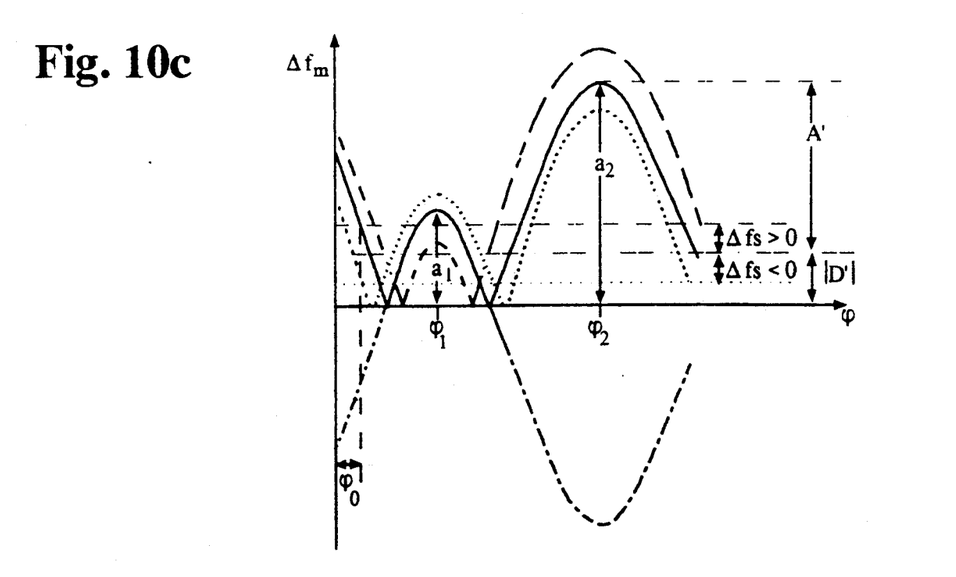

The functional dependence of the frequency shift from the azimuth angle $\phi$ is described by the amount of a twice displaced sinus function. The first shift $D'$ results from the addition of the vertical wind component, while the second shift $\Delta f_s$ represents the Doppler shift because of the rotating mirror SP. The influence of the mirror rotation on the measuring curves is shown in FIGS. 10a to 10c for the following cases:

FIG. 10a, $D'=0$ (no vertical wind)
FIG. 10b, $D'=>0$ (upward vertical wind)
FIG. 10c, $D'=<0$ (downward vertical wind)

In FIGS. 10a to 10c the solid lines each indicate the measuring curves without mirror movement according to FIGS. 3a to 3c, the curves shown by dashed lines the measuring curves for $\Delta f_s > 0$ (a mirror movement in a forward direction) and the curves shown in dotted lines each indicate the measuring curves for $\Delta f_s < 0$ (a mirror movement in the reverse direction).

The sign of the wind vector then is the result of the change of the frequency shift measured during a movement reversal of the mirror SP. This can be seen in a particularly simple way when the two maximum values of the frequency shift are $\phi = \phi$ max and $\phi = \phi$ min. Accordingly, in the usual sense the wind direction is to be understood to be the azimuth angle $\phi$ of that maximum, the amplitude of which, i.e. the frequency shift $\Delta f_m$ of which, increases with the movement reversal from forward to reverse. In FIGS. 10a to 10c this is the azimuth angle $\phi = \phi$ min.

With a laser-Doppler-anemometer used for checking the method according to the invention it is possible to determine the component $V_{LOS}$ of the wind velocity in the range of 0.5 to 15 m/s in the direction of observation with an accuracy of approximately 0.2 m/s. A measurable additional Doppler shift therefore has to be generated by a signal movement having a velocity of $v_s > 0.2$ m/s.

The change in the measured frequency in relation to the back and forth movement of a retro-reflector, which can also be called a vibration movement at low amplitudes, was clearly observed when an arrangement in accordance with FIG. 8 and a placement of the arrangement according to the invention in the reference beam was used. The retro-reflector RR was given a vibrational movement by means of an eccentric drive at an amplitude of 1.5 mm and with a frequency of 10 to 100 Hz.

During a conical (sector) scan across four semicircles, namely
1. $\phi = 0°...180°$
2. $\phi = 180°...0°$
3. $\phi = 0°.....180°$
4. $\phi = 180°....0°$ the direction of movement of the mirror was changed, where the velocity $v_s \approx 0.3$ m/s for an elevation angle $\theta$ was $\approx 20°$. Evaluation showed that the frequency shift in the maximum of the measuring curves for the cases 2 and 4 (a movement in the forward direction) is visibly greater than with the measurement curves for the cases 1 and 3 for a reverse movement. Here the frequency shift corresponded to approximately twice the mirror velocity.

The tests which were conducted thus have clearly shown that the two arrangements for the implementation of the method in accordance with the invention described in detail above can be used for the remote measuring of winds, because, without question, it is possible to determine and ascertain the sign of the wind direction by means of the particle stream flowing in the same direction.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for the determination of the sign of the direction of a particle stream by use of a heterodyne-laser-Doppler method to determine the velocity, in which in an interferometer device the beam of a laser source (L) is directed to a volume to be measured by means of an optical arrangement (O) used as optical emitter and in which, by use of the same optical arrangement (O) used as optical receiver, frequency difference is measured by means of heterodyne reception between the emitted laser beam and the laser beam returning into the optical arrangement (O) used as an optical receiver, the latter having been frequency-shifted as a result of scattering caused by particles moving in the particle steam with the same speed and because of the Doppler effect and where an additional frequency change is impressed on the laser beam, characterized in that
   a. temporally displacing the additionally impressed frequency change;
   b. measuring when the additionally impressed frequency change is smaller than the frequency shift caused by the particle movement;
   c. measuring the frequency difference between the emitted and returning laser radiation at at least two points in time, where the additionally impressed frequency shifts have different values;
   d. alternately impressing the additional frequency shift of the laser radiation in exactly defined areas of the path of radiation (R; $S_o$; $S_i$; $S_o/S_i$) $S_o$ is the outgoing signal path; $S_i$ is the incoming signal beam, $S_o/S_i$ is the path where the incoming signal ($S_i$) is in the opposite direction to and parallel to $S_o$ the outgoing signal, and R is the reference beam, and;
   e. determining by a comparison of the frequencies appearing on a radiation detector during superimposition of the back-scattered, received laser beam ($S_i$) and of a laser reference beam (R) the sign of the direction of the particle stream.

2. A method in accordance with claim 1, characterized by impressing the additionally impressed frequency change on a reference beam (R) split off the laser beam.

3. A method in accordance with claim 1, characterized by impressing the additionally impressed frequency change on an emitter beam (Se) split off the laser beam.

4. A method in accordance with claim 1, characterized by impressing additionally impressed frequency change on a laser beam (signal beam Si) scattered back by the measuring volume.

5. A method in accordance with claim 1, characterized by impressing additionally impressed frequency change on the emitter beam (Se) and the signal beam (Si) flowing in opposite directions in the optical arrangement (O).

6. A method in accordance with claim 1, characterized by determining the direction of the particle stream by comparing the sign shifts.

7. A method in accordance with claim 1, further comprising the steps of using an interferometer arrangement with a laser source (1), using an optical arrangement (0) as an optical emitter and receiver, with deflection mirrors ($M_1$ to $M_5$), with beam splitters ($BS_1$, $BS_2$), with a Brewster window (BW) and with $\lambda/4$-and $\lambda/2$-phase shifter plates, generating an additional impressed frequency change, fixing the direction of a mirror (SP) in the optical arrangement (O), putting the mirror (SP) into eccentric rotation around a turning axis (A) in such a way, that the laser beam is emitted in the tangential plane of the rotational circle of the eccentrically rotating mirror (SP), and alternately rotating the mirror (SP) clockwise and counterclockwise.

8. A method in accordance with claim 5, further comprising the steps of using an interferometer arrangement with a laser source (1), using an optical arrangement (O) as an optical emitter and receiver, with deflection mirrors ($M_1$ to $M_5$), with beam splitters ($BS_1$, $BS_2$), with a Brewster window (BW) and with $\lambda/4$- and $\lambda/2$- phase shifter plates, and, generating an additionally impressed frequency change, fixing the direction of a mirror (SP) in the optical arrangement (O), putting the mirror (SP) into eccentric rotation around a turning axis (A) in such a way, that the laser beam is emitted in the tangential plane of the rotational circle of the eccentrically rotating mirror (SP), and further comprising the steps of alternately rotating the mirror (SP) clockwise and counterclockwise.

9. A method in accordance with claim 6, further comprising the steps of using an interferometer arrangement with a laser source (1), using an optical arrangement (O) as an optical emitter and receiver, with deflection mirrors ($M_1$ to $M_5$), with beam splitters ($BS_1$, $BS_2$), with a Brewster window (BW) and with $\lambda/4$- and $\lambda/2$- phase shifter plates, and generating an additionally impressed frequency change, fixing the direction of a mirror (SP) in the optical arrangement (O), putting the mirror (SP) into eccentric rotation around a turning axis (A) in such a way, that the laser beam is emitted in the tangential plane of the rotational circle of the eccentrically rotating mirror (SP), and alternately rotating the mirror (SP) clockwise and counterclockwise.

10. A method in accordance with claim 7, further comprising rotating the mirror (SP) at different speeds.

11. A method in accordance with claim 1, further comprising the step of choosing a value of the additionally impressed frequency change which is smaller than the Doppler shift created by the particle stream by controlling the speed of the mirror movement.

12. An method in accordance with claim 6 further comprising the step of chosing a value of the additionally impressed Doppler shift which is smaller than the Doppler shift created by the particle stream by controlling the speed of the mirror movement.

13. An apparatus for the determination of the sign of the direction of a particle stream, for example by the use of an interferometer device having a laser source (L), an optical arrangement (O) used as optical emitter and receiver and with a detector (D), where the following are disposed in the following order:

a first beam splitter ($BS_1$), a first reflecting mirror (M3), a $\lambda/4$ phase-shifter plate and two additional reflecting mirrors (M4, M5) in a first area of the course of the beam ($S_o$) between the laser source (L) and the optical arrangement (O), the two reflecting mirrors (M4, M5), the $\lambda/4$ phase-shifter plate, a Brewster window (BW) and a second beam splitter ($BS_2$) in a second area of the course of the beam (SI) between the optical arrangement (O) and the detector (D), and the first beam splitter ($BS_1$), a fourth reflecting mirror (M1), a $\lambda/2$ phase-shifter plate, a fifth reflecting mirror (M2) and the second beam splitter ($BS_2$) in a third area of the course of the beam (R) between the laser source (L) and the detector (D);

a movable mirror in the form of a retro-reflector (RR) or of a plane mirror is provided in the alternately exactly determined areas of the course of the beam ($S_o$, $S_i$; R; or $S_o$ and $S_i$) of the interferometer device (R; $S_o$; $S_i$; $S_o/S_i$) $S_o$ is the outgoing signal path; $S_i$ is the path where the incoming signal ($S_i$) is in the opposite direction to and parallel to $S_o$ the outgoing signal, and R is the reference beam; and for generating an additionally impressed, temporally displaced Doppler shift;

wherein the measurement of the frequency difference between a scattered and a non-scattered laser beam takes place during at least two different points in time ($t_1$, $t_2$), where the movable mirror moves with respectively different speeds.

14. An apparatus in accordance with claim 13, further comprising means for measuring the frequency difference between the scattered and the non-scattered laser beam takes place at a first point in time ($T_1$) when the movable mirror is motionless (i.e. has a velocity of zero), and at a second point in time, when the movable mirror moves.

15. An apparatus in accordance with claim 13, further comprising means for measuring the frequency difference between the scattered and the non-scattered laser beam takes place at a first point in time ($t_1$) when the movable mirror moves in a first direction with a defined speed, and at a second point in time ($t_2$), when the movable mirror moves with the same amount of speed in a direction opposite said first direction.

16. An apparatus in accordance with claim 13, further comprising means for measuring the frequency difference between the scatter and the non-scattered laser beam takes place at a first point in time ($t_1$) when the movable mirror moves with a defined speed (v1), and at a second point in time (t2), when the movable mirror moves with a speed (v1) with a different from the defined speed (v1).

* * * * *